United States Patent [19]

Protzman

[11] Patent Number: 4,644,038

[45] Date of Patent: Feb. 17, 1987

[54] UNSATURATED POLY (ALPHA-HYDROXY ACID) COPOLYMERS

[75] Inventor: Thomas F. Protzman, Decatur, Ill.

[73] Assignee: A. E. Staley Manufacturing Company, Decatur, Ill.

[21] Appl. No.: 781,841

[22] Filed: Sep. 30, 1985

[51] Int. Cl.$^4$ .................. C08G 63/08; C08L 67/04; C08L 67/06

[52] U.S. Cl. ...................... 525/412; 525/415; 528/354; 528/355; 528/357

[58] Field of Search ............ 528/354, 355, 357; 525/412, 415

[56] References Cited

U.S. PATENT DOCUMENTS

| | | | |
|---|---|---|---|
| 3,636,956 | 1/1972 | Schneider | 128/335.5 |
| 3,784,585 | 1/1974 | Schmitt et al. | 528/354 X |
| 3,795,701 | 3/1974 | Jenkins et al. | 528/354 X |
| 3,984,439 | 10/1976 | Vanlautem et al. | 528/354 X |
| 4,475,998 | 10/1984 | Okitsu et al. | 528/354 X |

OTHER PUBLICATIONS

Chujo et al., "Ring-Opening Polymerization of Glycolide", Die Makromoleculare Chemie 100, 262–267 (1967).

Primary Examiner—Earl Nielsen
Attorney, Agent, or Firm—Michael F. Campbell; James B. Guffey; Philip L. Bateman

[57] ABSTRACT

An unsaturated poly (alpha-hydroxy acid) copolymer is prepared by reacting a cyclic diester of an alpha-hydroxy acid having 2 to 5 carbon atoms with an ethylenically-unsaturated epoxide. The reaction is conducted at a temperature of 50° to 250° C. in the presence of an effective amount of a ring-opening catalyst and an effective amount of a free-radical polymerization inhibitor.

16 Claims, No Drawings

UNSATURATED POLY (ALPHA-HYDROXY ACID) COPOLYMERS

FIELD OF THE INVENTION

This invention relates generally to polymers. More particularly, this invention relates to unsaturated poly-(alpha-hydroxy acid) copolymers.

BACKGROUND OF THE INVENTION

A. Polyesters in General

Polyesters are the polycondensation products of a dicarboxylic acid and a dihydroxy alcohol. For example, the most widely used polyester in the world, polyethylene terephthalate, is formed by reacting terephthalic acid (or dimethyl terephthalate) with ethylene glycol:

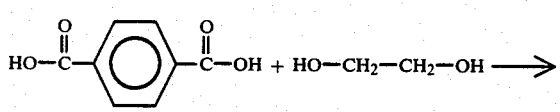

Terephthalic acid     Ethylene glycol

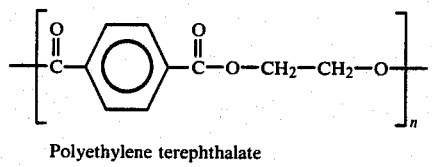

Polyethylene terephthalate

Saturated, linear polyesters, such as polyethylene terephthalate, are flexible and are used primarily to make fibers. Polyester fibers are, in turn, used as clothing fabric (Dacron is a trademark of E. I. duPont de Neumours & Co. for a polyester fiber made from polyethylene terephthalate), tire fabric, seat belts etc.

To impart thermosetting properties to polyesters, it is often desirable to "cross link" the linear polymer chains. A cross-linked polyester is generally prepared by first introducing ethylenic unsaturation into the chains by the use of an unsaturated dicarboxylic acid, e.g., maleic acid. Next, the unsaturated polyester chain is dissolved in a vinyl monomer, e.g., styrene. The addition of a vinyl polymerization catalyst then catalyzes the copolymerization and the chains are cross-linked. This two-step process can be represented as follows:

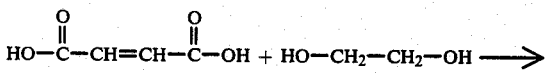

Maleic acid     Ethylene glycol

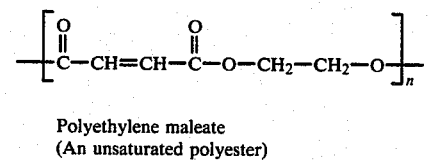

Polyethylene maleate
(An unsaturated polyester)

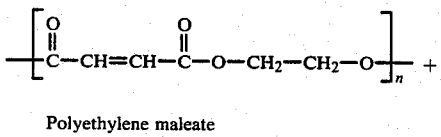 +

Polyethylene maleate

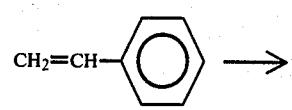

Styrene

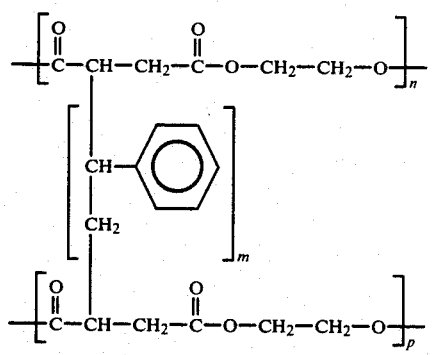

Polyethylene maleate-polystyrene copolymer
(A cross-linked polyester)

The unsaturated polyester resins are often handled as solutions in a vinyl monomer. They have the ability, when catalyzed, to copolymerize (cross-link) under atmospheric pressure and at moderate temperatures to form rigid plastics. The hardening resulting from the cross-linking is often referred to as "curing". These resins are widely used to fabricate plastic items, often in combination with fiber glass or other reinforcing materials, and are also used as coatings and laminates.

The unsaturated polyester resins are relatively expensive and are generally derived from petroleum feedstocks. A demand exits for replacements and/or substitutes which are less expensive and which can be derived from renewable resources.

B. Alpha-Hydroxy Acids and Their Cyclic Diesters

An alpha-hydroxy acid is a compound having the general formula:

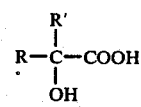

The more common alpha-hydroxy acids include glycolic acid, lactic acid, alpha-hydroxy butyric acid, and alpha-hydroxy valeric acid. Because alpha-hydroxy acids contain both hydroxyl and carboxyl functional groups, they can undergo self-esterification when heated to form cyclic six-membered diesters. These diesters are sometimes referred to generically as lactides. However, the term "lactide" is used herein to refer only to the cyclic diester of lactic acid. The structure of glycolide and lactide, the two most common cyclic diesters of alpha-hydroxy acids, are shown below:

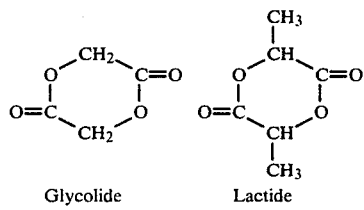

Glycolide          Lactide

Lactide, like the cyclic diesters of higher alpha-hydroxy acids, has an asymmetrical carbon atom and exists in two optically active forms, D-(+)-lactide and L-(−)-lactide. The racemic mixture, generally designated D,L-lactide, is optically inactive and is much more readily available than either of the optically active forms. When the stereochemistry of the cyclic diesters is not critical, the prefixes "L-(−)-", "D-(+)-", and "D,L-" are omitted herein.

The cyclic diesters of alpha-hydroxy acids can be polymerized through the use of ring-opening catalysts to form high molecular weight polymers. Poly(lactic acid) is often represented as follows:

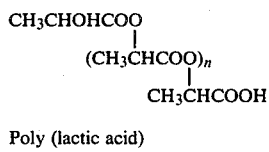

Poly (lactic acid)

Poly(lactic acid) and copolymers of lactic acid and glycolic acid are articles of commerce and are widely used for surgical sutures. See, e.g., Schneider, U.S. Pat. No. 3,636,956, issued Jan. 25, 1972. The very property which makes these polymers useful for sutures, biodegradability (they de-esterify in the presence of water), limits their utility in applications where stability is desired. Nevertheless, polymers based in whole or in part on lactide are of interest because lactide can be derived by fermentation from glucose. Glucose, in turn, is readily available from the acid or enzyme hydrolysis of starch. Accordingly, lactide polymers may be derived from renewable resources such as corn starch rather than from petroleum.

C. Epoxides

Epoxides are compounds containing the oxirane ring:

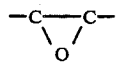

Epoxides are cleaved relatively easily by acid catalysts and may even be cleaved under alkaline conditions. Under certain conditions, the self-polymerization of epoxides can be induced. Ethylene oxide is commonly polymerized to form poly(oxy)ethylene (also called polyethylene glycol):

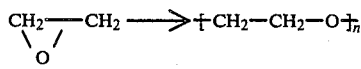

and it has been reported that propylene oxide self-polymerizes in the presence of iron (III) catalysts:

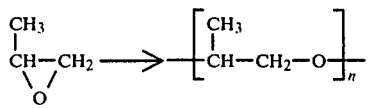

Propylene oxide          Poly (oxy) propylene

The copolymerization of certain saturated and aromatic epoxides with glycolide has been reported by K. Chujo et al. in "Ring-Opening Polymerization of Glycolide", Die Makromolekulare Chemie 100 (1967) pp. 262–267 (Nr. 2397). Chujo et al. reported that styrene oxide copolymerized with glycolide "to some extent" in the presence of a ferric oxide-propylene oxide complex catalyst at 170° C. for 10 to 12 hours in a sealed ampule under reduced pressure. They also reported that epichlorohydrin copolymerized with glycolide to some extent in the presence of ferric oxide-propylene oxide complex and antimony trifluoride catalysts. Chujo et al. further report that phenylglycidyl ether "hardly" copolymerized with glycolide.

SUMMARY OF THE INVENTION

The general objects of this invention are to provide a new class of plastic compounds and a process for preparing them. A particular object of one embodiment of this invention is to provide unsaturated poly(alpha-hydroxy acid) copolymers, some of which can be derived from renewable resources. A particular object of another embodiment of this invention is to provide a process for preparing unsaturated poly(alpha-hydroxy acid) copolymers.

I have discovered a new class of unsaturated poly(alpha-hydroxy acid) copolymers. The copolymers comprise: (a) a plurality of first repeating units derived from a cyclic diester of an alpha-hydroxy acid, each unit having the formula:

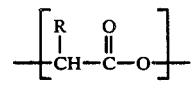

where R is hydrogen or an organic group having 1 to 3 carbon atoms; and (b) a plurality of second repeating units derived from an ethylenically-unsaturated epoxide, each unit having the formula:

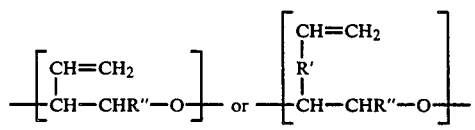

where R' is an organic group having 1 to 12 carbon atoms and R" is hydrogen or an organic group having 1 to 12 carbon atoms.

I have also discovered a new process for preparing unsaturated poly(alpha-hydroxy acid) copolymers. The process comprises reacting a cyclic diester of an alpha-hydroxy acid having 2 to 5 carbon atoms with an ethylenically-unsaturated epoxide at a temperature of about 50° to 250° C. in the presence of an effective amount of a ring-opening catalyst and an effective amount of a free-radical polymerization inhibitor.

The unsaturated poly(alpha-hydroxy acid) copolymers of this invention may be used to make fibers. The copolymers are soluble in vinyl monomers and may be cross-linked with the vinyl monomers by the addition of a vinyl polymerization catalyst. The cross-linked copolymers are suitable for the fabrication of plastic items and for use as coatings and laminates. Accordingly, the unsaturated poly(alpha-hydroxy acid) copolymers are excellent substitutes and/or replacements for unsaturated polyester resins. Furthermore, these copolymers can be prepared from lactide, which, in turn, can be easily derived from corn, a renewable resource.

DETAILED DESCRIPTION OF THE INVENTION

A. The Invention in General

The ring-opening copolymerization of a cyclic diester of an alpha-hydroxy acid having 2 to 5 carbon atoms with an ethylenically-unsaturated epoxide is illustrated below using the simplest cyclic diester, glycolide, and the simplest ethylenically-unsaturated epoxide, butadiene mono epoxide:

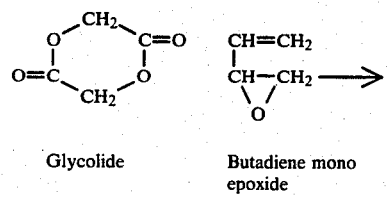

Glycolide    Butadiene mono epoxide

A random, linear unsaturated poly(glycolic acid) copolymer having the following two repeating units:

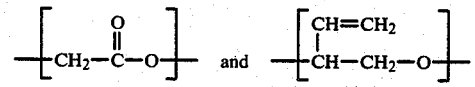

As illustrated above, the ethylenically-unsaturated epoxide is incorporated into the copolymer chain by the opening of its oxirane ring rather than by the free radical polymerization of its vinyl group, $CH_2=CH-$. As explained in detail below, the vinyl group of the epoxide is very reactive and steps must be taken to inhibit its reactivity to ensure the resulting copolymer is linear and unsaturated.

The cross-linking of the linear, unsaturated copolymer with a vinyl monomer such as styrene can be represented as follows:

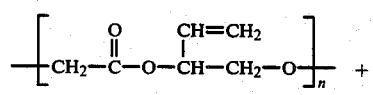

An unsaturated poly(glycolic acid) copolymer

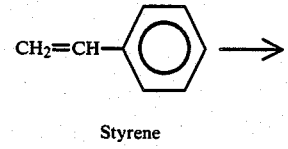

Styrene

-continued

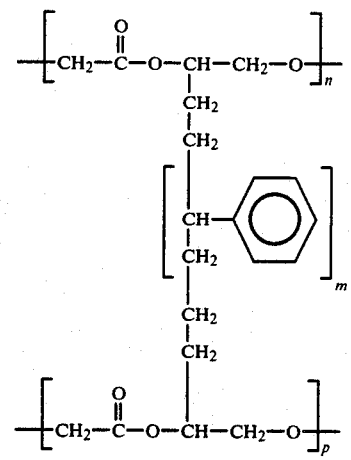

A cross-linked poly(glycolic acid) copolymer

B. Cyclic Diesters of Alpha-Hydroxy Acids

Cyclic diesters of alpha-hydroxy acids having 2 to 5 carbon atoms are suitable for use in the process of this invention. These diesters can be represented as follows:

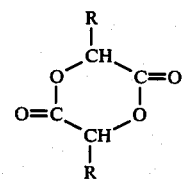

where R is hydrogen or an organic group having 1 to 3 carbon atoms. Although the two "R" groups are generally the same, they may be different. For example, glycolic acid and lactic acid can form a cyclic diester in which one "R" group is hydrogen and the other "R" group is a methyl group. Suitable diesters include glycolide (the cyclic diester of the 2 carbon glycolic acid); lactide (the cyclic diester of the 3 carbon lactic acid); 3,6-diethyl-1,4-dioxane-2,5-dione (the cyclic diester of the 4 carbon alpha-hydroxy butyric acid); and 3,6-dipropyl-1,4-dioxane-2,5-dione (the cyclic diester of the 5 carbon alpha-hydroxy valeric acid). Cyclic diesters of alpha-hydroxy acids having more than five carbon atoms are operable, but impractical due to their cost.

The cyclic diesters are employed instead of their corresponding acids because the diesters tend to form longer polymeric chains. Lactide and glycolide are the preferred diesters because of their ready availability and the desirable physical properties of their copolymers. Lactide is the preferred diester for the same reasons. As previously mentioned, the stereochemistry of the diesters is not critical to this invention, but the physical properties of the copolymers are affected, to a greater or lesser degree, by the stereochemistry.

C. Ethylenically-Unsaturated Epoxides

The other reactant in the process of this invention is an ethylenically-unsaturated epoxide having the structure:

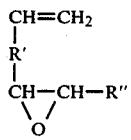

where R' is an organic group having 1 to 12 carbon atoms and is optionally present and R" is hydrogen or an organic group having 1 to 12 carbon atoms. In other words, the simplest ethylenically-unsaturated epoxide is butadiene mono epoxide in which there is no R' group and R" is hydrogen.

Ethylenically-unsaturated epoxides contain two functional groups which are important to this invention. The oxirane ring provides the mechanism by which the epoxide is incorporated into the linear, copolymer chain with the repeating units from the cyclic diester. The ethylenic unsaturation provides the mechanism by which the linear unsaturated copolymer may be cross-linked with vinyl monomers. The structure of the rest of the molecule, represented by R' and R", is not critical, but it does affect the physical properties of the epoxide and the resulting copolymer. Preferred physical properties include miscibility with the cyclic diesters and low vapor pressure (so the ring-opening copolymerization reaction can be conducted with liquid reactants under atmospheric or slightly superatmospheric pressures). For example, the following ethylenically-unsaturated epoxides (in addition to butadiene mono epoxide) are well suited for use in this invention:

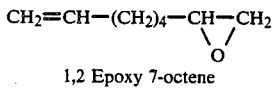
1,2 Epoxy 7-octene

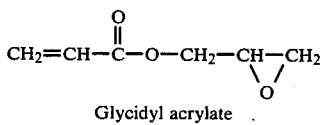
Glycidyl acrylate

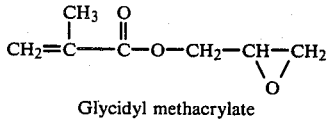
Glycidyl methacrylate

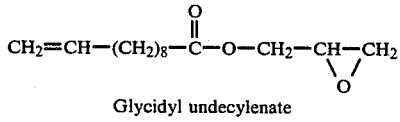
Glycidyl undecylenate

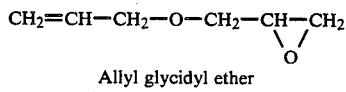
Allyl glycidyl ether

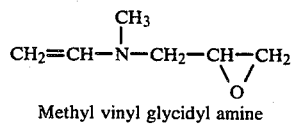
Methyl vinyl glycidyl amine

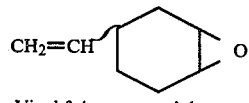
Vinyl 3,4-epoxy cyclohexane

-continued

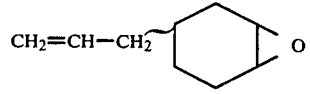
Allyl 3,4-epoxy cyclohexane

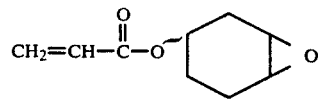
3,4-Epoxy-cyclohexyl acrylate

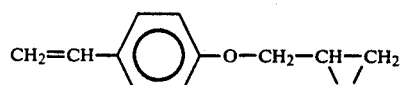
2,3-Epoxypropyl 4-vinyl phenyl ether

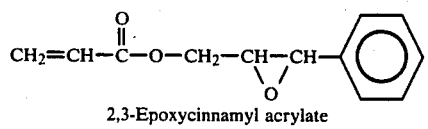
2,3-Epoxycinnamyl acrylate

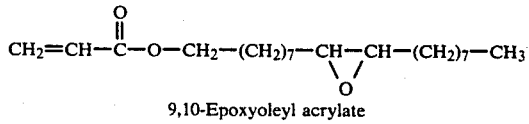
9,10-Epoxyoleyl acrylate

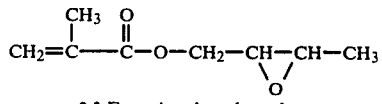
2,3-Epoxybutyl methacrylate

The most preferred ethylenically-unsaturated epoxides are glycidyl acrylate and glycidyl methacrylate because of their low cost, reactivity, miscibility, and low vapor pressure.

D. Ring-Opening Copolymerization Reaction Conditions

The reaction between the cyclic diester of an alpha-hydroxy acid having 2 to 5 carbon atoms and the ethylenically-unsaturated epoxide may be conducted under a broad range of reaction conditions. The reaction temperature is chosen so that both the cyclic diester and the epoxide are liquids. Temperature in the range of about 50° to 250° C. are generally employed. Higher temperatures increase the rate of the desired, ring-opening polymerization reaction, but also increase the probability of premature vinyl polymerization of the epoxide. The preferred reaction temperature is about 125° to 200° C.

The reaction pressure is not critical so long as it is such that the reactants are liquids at the reaction temperature. In some ring-opening polymerizations it has been reported that gaseous oxygen should be avoided by use of a high vacuum or an inert gas blanket. Such procedures for excluding oxygen are neither necessary nor desirable for this process. While not wishing to be bound by theory, it is believed the presence of oxygen may actually enhance the effectiveness of the free-radical polymerization inhibitor and thereby help prevent premature cross-linking.

A large number of ring-opening catalysts are known in the art and are effective in the process of this invention. The more common catalysts include the tin and zinc salts such as stannous ethyl hexanoate, tin chloride, diethyl zinc, and zinc oxide. Other ring-opening catalysts are listed in Casey, U.S. Pat. No. 3,912,692, issued Oct. 14, 1975, at column 2, lines 42 to 62. The catalyst is used in an effective amount with the exact amount depending to a large extent upon the reactants and catalyst employed and the operating variables including time, temperature, and pressure. In general, a catalyst concentration in the range of about 0.01 to 2.0 weight percent, based on the combined weight of the cyclic diester and epoxide, is suitable.

As previously mentioned, it is necessary to minimize the tendency of the ethylenically-unsaturated epoxide to undergo vinyl polymerization during the ring-opening copolymerization. One of the more useful features of the linear, unsaturated poly(alpha-hydroxy acid) copolymers of this invention is their ability to dissolve in vinyl monomers and then cross-link upon the addition of a vinyl polymerization catalyst. Premature vinyl polymerization produces a cross-linked copolymer which is not as soluble in vinyl monomers. Accordingly, free-radical polymerization inhibitors are employed to minimize premature vinyl polymerization.

Many free-radical polymerization inhibitors are known in the art and they include the quinones (e.g., p-benzoquinone; hydroquinone; 2,5 dihydroxy-p-benzoquinone; 1,4 naphthoquinone; and 2,5 diphenyl-p-benzoquinone); aromatic nitrogen compounds; trinitro benzene; sulfur; ammonium thiocyanate; dinitrochlorobenzene; 2,-2-diphenyl-1-picrylhydrazyl; metal halides; 2,6-di-t-butyl cresol; quaternary ammonium halides; picric acid; chloranil; 4-amino-1-napthol; copper; and copper compounds. The preferred inhibitors are the quinones without hydroxy groups, such as p-benzoquinone; 1,4 naphthoquinone; and 2,5-diphenyl-p-benzoquinone. The quinones with hydroxy groups are not as effective because, it is believed, the hydroxy groups react with the cyclic diesters. The free-radical polymerization inhibitor is used in an effective amount with the exact amount depending to a large extent upon the inhibitor employed and the polymerization characteristics of the vinyl group. In general, an inhibitor concentration of about 0.01 to 1.0 weight percent, based on the weight of the epoxide is suitable.

The molar ratio of cyclic diester to epoxide is chosen based on the desired properties for the copolymer. In general, the molar ratio is at least 0.5 and, accordingly, at least 50 percent of the repeating units in the copolymer are derived from the cyclic diester (each diester contributes two repeating units to the copolymer whereas each epoxide contributes only one repeating unit). It is preferred that the molar ratio be at least 2.0 so that at least 80 percent of the repeating units are derived from the cyclic diester.

The copolymerization reaction may be conducted neat or in solution using a suitable, inert organic solvent such as benzene, acetone, the petroleum fractions, etc. Solution polymerization allows the ring-opening copolymerization to be conducted at lower temperatures, but requires longer reaction times and larger amounts of catalyst, other things being equal. It is preferred that the copolymerization be conducted neat.

The copolymerization can be conducted in a batch, semi-continuous, or continuous manner using equipment of the type normally employed in the art of making polymers. Assuming adequate amounts of catalyst, the copolymerization goes to completion in a short time, generally within several hours.

E. Cross-Linking with Vinyl Monomers

A major use of the linear, unsaturated poly(alpha-hydroxy acid) copolymers of this invention is as an intermediate in preparing cross-linked copolymers which are, in turn, used as coatings and laminates and in the fabrication of plastic items. Cross-linking increases the rigidity of the copolymer, raises the softening temperature, and makes the copolymer insoluble in most organic solvents.

The cross-linking is performed by dissolving the unsaturated copolymer in a suitable vinyl monomer and then adding a vinyl polymerization catalyst at a temperature sufficient to activate the catalyst. The vinyl monomers copolymerize and cross-link the copolymer chains through the pendant vinyl groups as shown in the preceding Section A. A wide variety of vinyl monomers may be used. Suitable vinyl monomers include acrylic acid, acrylic esters, methacrylic acid, methacrylic esters, acrylonitrile, methacrylonitrile, vinyl acetate, vinyl propionate, diallyl phthalate, styrene, alpha-methyl styrene, vinyl toluene, chlorostyrene, dichlorostyrene, allyl acrylate, vinyl chloride, vinylidene chloride, acrylamide, methacrylamide, maleic acid, fumaric acid, maleic anhydride, and vinyl pyrrolidone.

The preferred vinyl monomers are styrene and the lower alkyl esters of acrylic acid and methacrylic acid. These vinyl monomers are widely available, polymerize easily, and provide a wide range of physical properties to the cross-linked copolymers. For example, methyl methacrylate cross-linked copolymers are generally rigid with high softening temperatures and good resistance to sunlight. On the other hand, copolymers cross-linked with ethyl or butyl acrylate are flexible with low softening temperatures.

The cross-linking of the unsaturated poly(alpha-hydroxy acid) copolymers with vinyl monomers is generally performed under the same conditions as employed when cross-linking unsaturated polyester resins with vinyl monomers. An overview of these conditions is found at Boenig, H. V., *Unsaturated Polyesters* (Elsevier Pub. Co. 1964).

F. Example

The following example is illustrative only:

EXAMPLE 1

This example illustrates the preparation of an unsaturated poly(lactic acid) copolymer with glycidyl methacrylate and the subsequent cross-linking with methyl methacrylate.

Thirty-Two and four-tenths grams (32.4 g) of crystalline d-l lactide (a racemic mixture) were placed in a 100 ml glass Ehrlenmeyer flask and placed in an oven at 150° C. for about 30 minutes to melt the lactide. After the lactide had fully melted, the flask was withdrawn from the oven and the following were added, with shaking, in rapid succession: (1) 0.1 ml of a 1.0 weight percent solution of 2,5 diphenyl-p-benzoquinone in dibutyl phthalate as a free-radical polymerization inhibitor; (2) 0.75 ml of a 50.0 weight percent solution of stannous ethyl hexanoate in dibutyl phthalate as a ring-opening catalyst; and (3) 3.6 g of glycidyl methacrylate, an ethylenically-unsaturated epoxide. The mixture was then poured inside a three-inch diameter silicone rubber "O" ring placed on an open-faced mold of Teflon-coated steel. The viscous, molten mixture rapidly turned glassy as it cooled to room temperature.

After cooling to room temperature, the other side of the mold was bolted into place. The "O" ring acted as a spacer and also confined the mixture. A Teflon capillary tube was inserted under the "O" ring into the mixture to allow for pressure relief. The mold was then placed in an oven at 175° C. for one hour to permit the copolymerization to proceed. After one hour, the mold was placed in cold water to quench the polymerization reaction. The clear, hard copolymer was then removed from the mold and ground in a Wiley mill to a coarse, granular powder. The powder was then analyzed by gas chromatography and NMR spectroscopy. The gas chromatography indicated the presence of 0.03 weight percent lactic acid, 2.10 weight percent lactide, and 0.11 weight percent glycidyl methacrylate as unreacted reactants. The NMR analysis indicated the absence of epoxy groups in the copolymer, thus showing that glycidyl methacrylate was incorporated into the copolymer by ring-opening rather than by free radical polymerization of the vinyl group.

The cross-linking was then performed as follows: One part by weight of the ground copolymer was dissolved in two parts by weight of methyl methacrylate monomer. Five grams (5.0 g) of this solution were then placed in a vial and 0.25 g of benzoyl peroxide were added as a free radical initiator. Three drops of a 10.0 weight percent solution of dimethyl aniline in dibutyl phthalate were then added as an accelerator. The vial was shaken briefly by hand to ensure uniform mixing and then allowed to stand at room temperature.

The solution solidified within two hours. After solidification, 15 g of chloroform were added to the vial. The copolymer did not dissolve, but instead swelled to form a firm, but friable gel typical of cross-linked polymers.

As a control to demonstrate the role of the glycidyl methacrylate in forming a stable, cross-linked copolymer, the above procedure was repeated except 36.0 g of the lactide and no glycidyl methacrylate were used. The gas chromatography analysis of the polymeric powder indicated the presence of 0.05 weight percent lactic acid and 2.68 weight percent lactide.

The powder was then dissolved in methyl methacrylate and the cross-linking reaction conditions repeated as described above. After solidification, 15 g of chloroform were added and the polymer completely dissolved. The complete dissolution indicated that no cross-linking resulted from the vinyl polymerization.

I claim:

1. An unsaturated poly(alpha-hydroxy acid) copolymer comprising:

(a) a plurality of first repeating units derived from a cyclic diester of an alpha-hydroxy acid, each unit having the formula:

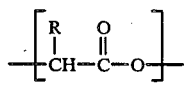

where R is hydrogen or an organic group having 1 to 3 carbon atoms; and (b) a plurality of second repeating units derived from an ethylenically-unsaturated epoxide, each unit having the formula:

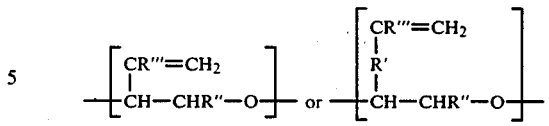

where R' is an organic group having 1 to 12 carbon atoms, R" is hydrogen or an organic group having 1 to 12 carbon atoms and R'" is hydrogen or a methyl group.

2. The copolymer of claim 1 wherein the second repeating units are derived from butadiene mono epoxide; 1,2 epoxy 7-octene; glycidyl acrylate; glycidyl methacrylate; glycidyl undecylenate; allyl glycidyl ether; methyl vinyl glycidyl amine; vinyl 3,4-epoxy cyclohexane; allyl 3,4-epoxy cyclohexane; 3-4-epoxycyclohexyl acrylate; 2,3-epoxypropyl 4-vinyl phenyl ether; 2,3-epoxycinnamyl acrylate; 9,10-epoxyoleyl acrylate; and 2,3-epoxybutyl methacrylate.

3. The copolymer of claim 2 wherein the first repeating units are derived from glycolide or lactide.

4. The copolymer of claim 3 wherein at least 50 percent of the repeating units are first repeating units.

5. The copolymer of claim 4 wherein the second repeating units are derived from glycidyl acrylate or glycidyl methacrylate.

6. The copolymer of claim 5 wherein the first repeating units are derived from lactide.

7. The copolymer of claim 6 wherein at least 80 percent of the repeating units are first repeating units.

8. A process for preparing an unsaturated poly(alpha-hydroxy acid) copolymer, which process comprises reacting a cyclic diester of an alpha-hydroxy acid having 2 to 5 carbon atoms with an ethylenically-unsaturated epoxide at a temperature of about 50° to 250° C. in the presence of an effective amount of a ring-opening catalyst and an effective amount of a free-radical polymerization inhibitor.

9. The process of claim 8 wherein the epoxide comprises butadiene mono epoxide; 1,2 epoxy 7-octene; glycidyl acrylate; glycidyl methacrylate; glycidyl undecylenate; allyl glycidyl ether; methyl vinyl glycidyl amine; vinyl, 3,4-epoxy cyclohexane; allyl 3,4-epoxy cyclohexane; 3,4-epoxy cyclohexyl acrylate; 2,3-epoxypropyl 4-vinyl phenyl ether; 2,3-eposycinnamyl acrylate; 9,10-epoxyoleyl acrylate; or 2,3-epoxybutyl methacrylate.

10. The process of claim 9 wherein the cyclic diester comprises glycolide or lactide.

11. The process of claim 10 wherein the cyclic diester and the epoxide are liquids at the reaction conditions.

12. The process of claim 11 wherein the epoxide comprises glycidyl acrylate or glycidyl methacrylate.

13. The process of claim 12 wherein the ring-opening catalyst comprises stannous ethyl hexanoate, tin chloride, diethyl zinc, or zinc oxide and is present in an amount of about 0.01 to 2.0 weight percent, based on the combined weight of the cyclic diester and epoxide.

14. The process of claim 13 wherein the free-radical polymerization inhibitor comprises p-benzoquinone; 1,4 napthoquinone; or 2,5-diphenyl-p-benzoquinone and is present in an amount of about 0.01 to 1.0 weight percent, based on the weight of the epoxide.

15. A crosslinkable composition comprising the copolymer of claim 1 and a vinyl monomer.

16. The process of curing the composition of claim 15 by crosslinking said composition in the presence of an effective amount of a vinyl polymerization catalyst.

* * * * *

UNITED STATES PATENT AND TRADEMARK OFFICE
CERTIFICATE OF CORRECTION

PATENT NO. : 4,644,038
DATED : February 17, 1987
INVENTOR(S) : Thomas F. Protzman It is certified that error appears in the above-identified patent and that said Letters Patent are hereby corrected as shown below:

Column 9, line 44, change "epoxide" to ---epoxide,---

Column 12, line 20, change "and 2,3-epoxybutyl methacrylate" to ---or 2,3-epoxybutyl methacrylate---

Signed and Sealed this

Tenth Day of November, 1987

Attest:

DONALD J. QUIGG

Attesting Officer

Commissioner of Patents and Trademarks